Figure 1:
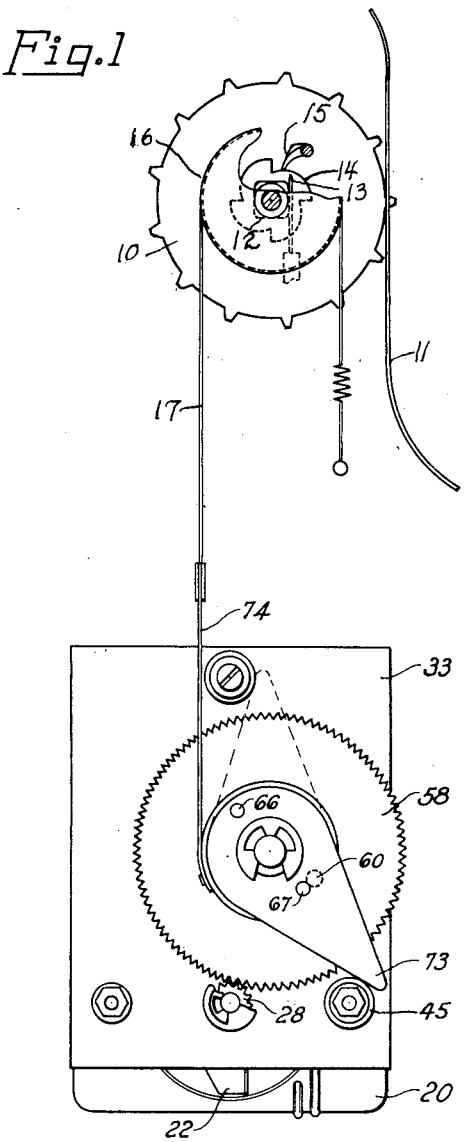

Oct. 16, 1951     M. D. TYLER ET AL     2,571,795

STRIP FILM ADVANCE MEANS

Filed Jan. 31, 1949     2 SHEETS—SHEET 1

INVENTORS
ROBERT H. LARSON
MERLE D. TYLER
BY Robert L Kahn
ATTORNEY

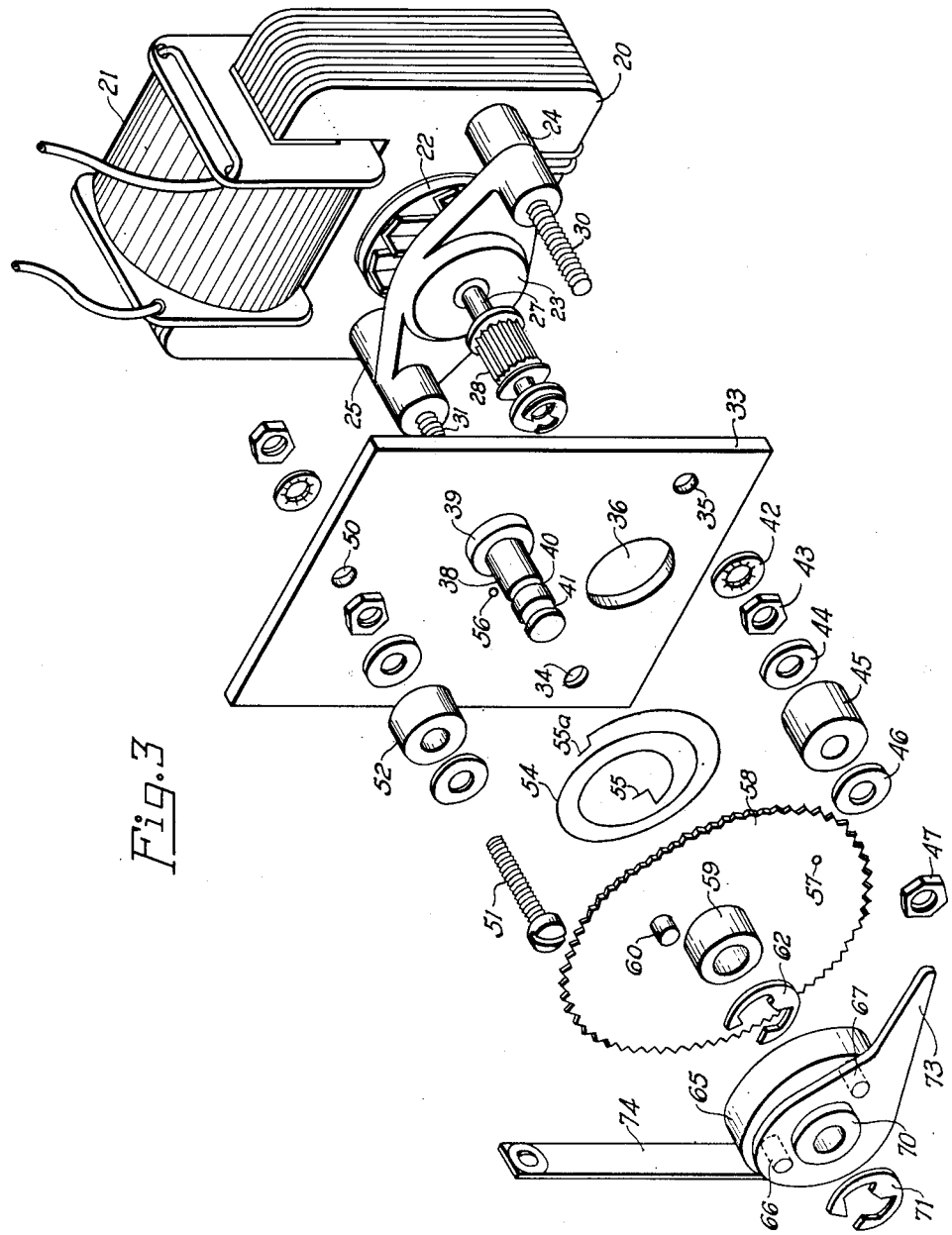

Patented Oct. 16, 1951

2,571,795

UNITED STATES PATENT OFFICE 2,571,795

STRIP FILM ADVANCE MEANS

Merle D. Tyler, Geneva, and Robert H. Larson, Batavia, Ill., assignors to Du Kane Corporation, a corporation of Illinois Application January 31, 1949, Serial No. 73,728

6 Claims. (Cl. 88—28)

This invention relates to an electrical apparatus and particularly to a means for advancing strip film through the gate of a projector.

Projectors having strip film to be advanced a frame at a time at irregular intervals through a film gate are in common use. As a rule such film may be advanced a frame at a time by manual means. While power means have been provided, such means as a rule have been expensive and have required substantial current to operate the same. Where electric power for operating a motor is obtained directly from a power line the amount of current or power necessary is not important within wide limits. However it frequently occurs that the electric power or current required for operating the motor must pass through a vacuum or gas discharge tube. Hence to avoid the necessity for a large expensive tube, it becomes important to provide a motor whose power demands are moderate.

Furthermore, since the dimensions and weight of a motor are important from the point of view of portability it is desirable that the motor be as small and as light as possible. A further advantage of a small, light but powerful motor resides in the cost. As a rule, the cost of a motor is substantially proportional to the cube of a dimension.

This invention provides a construction which is economical to manufacture, fool-proof and rugged and which is efficient so that a motor may be readily supplied from an electric circuit including a space or gas discharge tube as a part thereof without requiring an unduly large or high power tube. The strip film advancing means embodying the present invention has some lost motion therein so that the motor may come up to substantial speed before encountering any load. Hence, a simple squirrel cage type motor may be used having a rotor which turns quite freely. The motor drive includes means for permitting slippage to occur when the device has attained a home position, this usually occurring with sufficient suddenness so that some take-up for the shock of stopping must be provided. However, the entire film strip drive has sufficient flexibility so that rough handling of the film strip is avoided. The film strip itself is advanced only one frame at a time so that overrun is avoided.

The invention in general provides a drive including a motor having a freely turning rotor and a lost motion so that a substantial amount of kinetic energy may be stored in the system within a short period of time. Preferably the entire device has lost motion in several portions thereof so that successive increments of kinetic energy may be stored against that portion of the cycle when energy demands upon the system occur. A highly desirable feature of the invention embodying the present device resides in the fact that a complete unit may be readily attached to any film advance means with a minimum of change.

In general, the structure embodying the invention includes an alternating current motor of conventional construction. Preferably this motor is of the shaded pole type having a squirrel cage rotor. Such a motor may be energized by pulsating or alternating currents. It is important that the electric motor always turns in the same direction when energized. The motor shaft is coupled through a suitable slipping means to a drive having two places where lost motion occurs. The drive includes a flexible strap cooperating with a drum. Suitable stop means are provided to limit the amount of travel of the drum between predetermined points and these stop means in general may determine the amount of travel of a picture frame.

The flexible strap is connected between the drum and a suitable film advance mechanism, the latter preferably including a ratchet or some other over run drive means. When the motor is first energized, sufficient lost motion is provided to permit the motor rotor to start spinning and reach substantial speed before engaging any load. Thereafter the motor engaging a portion of the load starts to operate the same, this additional portion of the load is connected to the actual film advance means preferably through a second lost motion means so that additional mechanical parts may be brought up to a suitable operating speed.

When the film has been advanced a frame, the mechanism has generally reached the end of its travel and it is necessary to have the various parts stopped as quickly as possible. Due to the relatively large inertia of the motor rotor, it has been found desirable to provide a slipping clutch between the motor shaft and the remainder of the drive so that some travel of the rotor is permitted even after the remaining portions of the drive have stopped. In the event that the motor energization is continued, the parts remain in their end position. However, on de-energization of the circuit after completion of the operating cycle, spring means are provided for returning the drive to a starting position in preparation for a new operating cycle.

Figure 2:
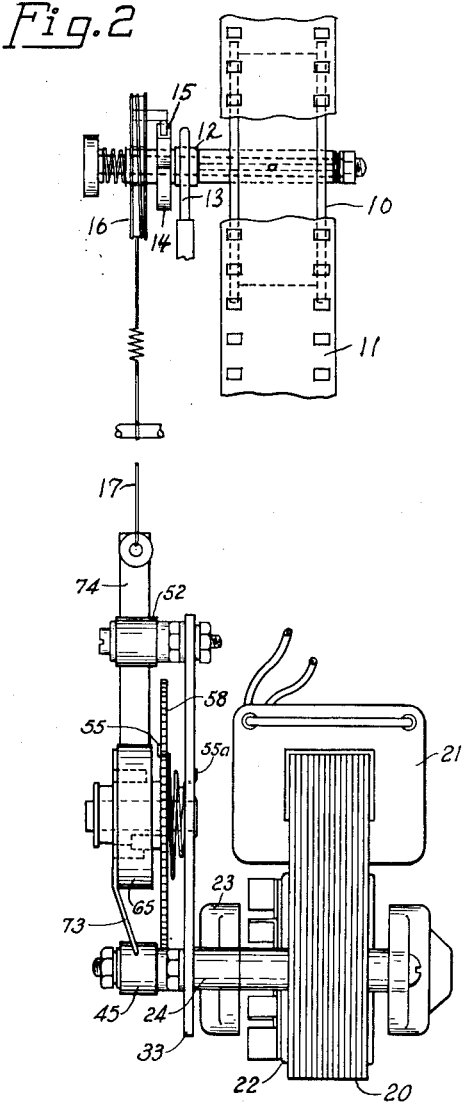

In order that the invention may be understood it will now be explained in connection with the drawing wherein Figure 1 shows a front view of a portion of a projector embodying the present invention, Figure 2 is a side view of the mechanism shown in Figure 1 and Figure 3 is an exploded perspective view of a device embodying the present invention.

A device embodying the present invention may be adapted to any projector having the usual light source and lens system all well known in the art. Such a projector includes a film gate through which film strip is adapted to be moved at irregular intervals. Thus referring to Figures 1 and 2, a film gate of conventional construction has a pair of sprockets 10 for driving film 11 by means of suitable apertures in the film. Sprockets 10 are connected through a suitable releasable clutch to square shaft 12. Square shaft 12 has suitable means such as spring finger 13 bearing on the same for indexing the shaft at 90 degree intervals. In accordance with usual practice, the clutch means is provided to permit relative movement between the sprockets and square shaft to permit framing. Inasmuch as this general type of film drive is well known, a detailed showing thereof is not deemed to be necessary.

Square shaft 12 carries ratchet 14 having four teeth. Cooperating with ratchet 14 is spring pawl 15 carried on drum 16 rotatable around shaft 10. When drum 16 is urged in one direction, counterclockwise as seen in Figure 1 for example, the pawl and ratchet drive operates so that drum 16 will turn square shaft and sprockets. When drum 16 is turned clockwise the pawl will ride over the ratchet teeth and permit free movement of the drum with respect to the square shaft and sprockets.

The ratchet is so oriented with respect to the square shaft that the pawl is between two teeth when the square shaft is in an indexed position. The angular lag of the ratchet with respect to the square shaft is not critical but must be less than 45°. Thus the drum when turned in a counterclockwise direction will turn freely through a certain angle before pawl 15 engages ratchet 14 to drive the square shaft. However once the square shaft has been driven through an angle greater than 45°, the indexing mechanism on the square shaft will tend to drive the square shaft toward the next index position irrespective of the pawl and ratchet drive. However, by virtue of the angle between the ratchet and square shaft, some lost motion between the drum and ratchet can occur before any driving load is present.

Drum 16 is turned by cable 17, which may consist of a strap of steel or other material. Strap 17 may have one end permanently attached to drum 16 and wound around drum 16 so that under all conditions the strap tends to wind or unwind with respect to the drum.

As shown in Figure 2, strap 17 extends downwardly and when pulled downwardly tends to drive the sprockets counterclockwise for moving the film through the gate. It is, of course, necessary that the various parts be so proportioned that the movement of square shaft 11 through an angle of 90° will drive the film through the gate for a distance corresponding to one frame.

Referring now to Figures 1 to 3 inclusive, the motive power for driving the mechanism comprises motor 20 having alternating current winding 21 and rotor 22 journaled in suitable bearings, one of which is shown at 23. Bearing 23 is supported at bosses 24 and 25 extending from the frame of the motor. This motor is preferably of the shaded pole type adapted to turn in one direction upon energization by single phase alternating current.

Rotor 22 has shaft 27 extending outwardly therefrom, said shaft carrying pinion 28. Pinion 28 is frictionally secured to shaft 27, the friction being great enough so that the motor may be loaded. However the pinion may slip on the shaft for sudden and sharp overloads as occur when the strip film advance operating cycle terminates.

Bosses 24 and 25 have bolts 30 and 31 extending outwardly therefrom. Secured on bolts 30 and 31 is metal plate 33. Plate 33 has apertures 34 and 35 for accommodating bolts 31 and 30 respectively and has aperture 36 for accommodating pinion 28 and shaft 27. Bolts 30 and 31 are long enough so that plate 33 when threaded on the bolt will have pinion 28 extending beyond plate 33. Plate 33 also carries pin 38 and collar 39 rigidly secured to the plate. Pin 38 has two annular slots 40 and 41 for purposes which will be apparent later.

Cooperating with bolt 30 are lock washer 42 and nut 43 for bolting plate 33 tightly against the bosses of the motor. Also cooperating with bolt 30 is washer 44, rubber sleeve 45, washer 46 and nut 47 all going over the bolt in the order named. Nut 47 is on the outside and serves to retain the washer and sleeve assembly in position.

Plate 33 also has suitable nuts and washers for cooperation with bolt 31 to bolt plate 33 against the motor. Plate 33 has aperture 50 through which passes bolt 51 for carrying rubber sleeve 52. The additional washers and nuts shown are for the purpose of rigidly maintaining bolt 51 in plate 33.

Disposed around collar 39 is coil spring 54 having one end 55 adapted to pass through aperture 56 in plate 33 for anchoring purposes. Spring 54 has other end 55a adapted to be threaded through aperture 57 in disc gear 58. Gear 58 has hub 59 and eccentric pin 60. Gear 58 is adapted to slide over pin 38 carried by the plate and may be locked against removal from the end of the shaft by C washer 62 of spring steel. This C washer cooperates with slot 40 in the pin. Coil spring 54 biases gear 58 to a certain normal position. Gear 58 meshes with pinion 28 so that the two turn together.

Rotatively disposed upon pin 38 is drum 65 carrying stops 66 and 67 in the interior thereof for cooperation with pin 60 of gear 58. Drum 65 has hub 70 which fits snugly around the end portion of pin 38. Spring C washer 71 cooperates with slot 41 of pin 38 to lock hub 65 against removal from the shaft. Hub 65 has rigidly attached thereto arm 73 and spring strap 74. Strap 74 is attached to strap 17.

The angle between the two rubber sleeves, the width of arm 73 and diameter of drum 65 are all properly proportioned so that the angular movement of arm 73 between the two stops corresponds to an operating movement for the film drive. Due to the presence of lost motion, particularly at the pawl and ratchet drive, as well as the tendency for the square shaft to be indexed, the various parts may be so proportioned that the ratchet drive will move the square shaft more than 45° beyond its indexed position after which the indexing means may take over and move the shaft itself.

In assembling the elements of the motor drive it is desirable to locate and orient the parts so that arm 73 is biased against stop 45 as shown in Figure 1. When motor 20 is energized, the rotor moves clockwise as seen in Figures 1 and 2. Due to the action of coil spring 54 and the lost motion existing between pin 60 and stops 66 and 67, the motor will have a light load for a part of a revolution of gear 58. By making the gear ratio between gear 58 and pinion 28 large it will be possible for the rotor of the motor to make one or more revolutions with little or no load. As the motor rotor turns clockwise and moves gear 58 counterclockwise, coil spring 54 will be wound and pin 60 will engage stop 66. By the time that stop 66 is engaged by pin 60, the motor will be turning at substantial speed and will have substantial torque. Further movement of gear 58 will thereupon cause arm 73 to move from stop 45 toward stop 52. At the same time strap 74 and cable 17 will be moved downwardly as seen in Figures 1 and 2. When arm 73 has moved away from stop 45 for a small portion of its travel, pawl 15 will engage ratchet 14 and actually load the motor with the task of turning square shaft 12. By this time the motor is turning at high speed and has substantial kinetic energy. This kinetic energy together with the normal torque of the motor at its running speed will suffice to turn square shaft 12 from one index position against the bias of the index means towards the next index position. This movement of square shaft 12 will naturally cause the film to travel.

Before square shaft 11 has reached its succeeding index position—this corresponding to the angle of lag between the ratchet and square shaft—arms 73 will reach stop 52. The elasticity of the straps as well as the flexibility of stop 52 will result in arm 73 and its associated drum being stopped quickly. When arm 73 is stopped by sleeve 52, it is clear that stop 66 will prevent pin 60 from advancing and thus will stop gear 58. The momentum of the motor rotor is substantial compared to the momentum of other mechanical elements so that it is desirable to permit the motor rotor to stop more gradually. To this end the frictional coupling between pinion 28 and the motor shaft may be so designed as to permit the motor to stop without undue strain upon the gear teeth. Such friction couplings are quite common in clocks and similar devices and may take on a variety of forms.

As long as motor 20 remains energized, whatever torque there is in the motor even after it has stopped will suffice to maintain arm 73 against stop 52. However, when the motor circuit is broken, spring 54 will unwind and cause gear 58 to return to its normal starting position where arm 73 rests against stop 45. This backward movement will result in some rotation of the motor. However that is unimportant.

By virtue of the invention it will be apparent that a simple construction has been provided using relatively simple and few parts which may be readily fabricated at a moderate cost. The motor itself is readily available on the market, in a variety of sizes and styles. The remaining parts, such as gears and pinions are simple.

Instead of drums, other means upon which a strap or cable may be wound and unwound or may be taken up may be used. Thus the strap end may cooperate with a reel or may be attached to the end of an arm.

What is claimed is:

1. A system for driving a film strip one frame at a time through the gate of a projector, said system comprising a square shaft having four index positions for moving film one frame at a time, a pawl and ratchet for driving said shaft in one direction only, said ratchet having four teeth, a drum carrying the pawl, a flexible strap attached to said drum and adapted to move the pawl for driving the square shaft, a second drum attached to said flexible cable, means defining angular limits of travel for said second drum, means for biasing said second drum to a normal position from which position when said drum is moved said pawl and ratchet may be actuated to move said film, said one position of said second drum providing lost motion between the pawl and ratchet prior to ratchet engagement, a disc having a lost motion connection to said second drum and an electric motor coupled to said disc to drive the same, said motor when energized turning said second drum from its one position to its other position to drive said film means for advancing film, said drum biasing means serving to return the part to normal position upon deenergization of said motor after completion of an operating cycle.

2. The structure according to claim 1 wherein said means for biasing said second drum comprises a spring biasing said disc.

3. The structure according to claim 1 wherein said disc is driven by said motor through a pinion and wherein said pinion is provided with a frictional coupling to said motor.

4. A motor drive for an intermittent type of film advance mechanism for a projector, said drive comprising a complete unit attachable to a projector, said drive comprising a base, an electric motor mounted on said base, said motor being of the type having a low starting torque, a disc rotatively supported on said base and coupled to said motor to be driven thereby at a reduced speed, a drum mounted for rotation upon said base, means on said drum cooperating with said base for defining a limited angular range of travel for said drum, a flexible strap having one end attached to said drum to be wound up thereon when said drum moves from one end of its range to the other end of its range, said flexible strap having a free end for attachment to an actuating member on said advance mechanism to cause said advance mechanism to move film forward one frame, lost motion means for rotatively coupling said disc and said drum, a coil spring between said base and disc for rotatively biasing said disc so that the drum is caused to assume a position at one end of its range, said motor when energized turning the disc in a direction against its spring bias to move the drum toward the other end of its range whereby said electric motor may come up to speed before full load is applied thereto, said drum and disc returning to a normal position upon deenergization of the electric motor.

5. The drive according to claim 4 wherein a friction coupling is provided between said disc and the rotor of the motor.

6. A motor drive for an intermittent type of film advance mechanism for a projector, said drive comprising a flat base plate, an electric motor mounted upon one side of the plate and having the motor shaft extending to the other side of the plate, a pin carried by said plate and extending vertically therefrom upon the other side of said plate, a flat disc rotatively secured on said pin, means for driving said disc from said motor shaft at reduced speed, a drum rotatively carried on said pin, said drum being disposed adjacent said disc, a lost motion connection between said disc and drum, a coil spring having one end anchored to said base and the other end anchored to said disc for biasing said disc rotatively, means on said base cooperating with means on said drum for defining an angular range of travel for said drum, said spring biasing said disc and said drum so that said drum normally rests at one end of its travel range from which end said motor when energized drives said drum toward the other end of its travel range, an elongated flexible member having one end attached to said drum and being adapted to wind up on the drum when said drum is moved from one end of its range to the other end of its range, said elongated member having its free end available for attachment to an actuating member on said advance mechanism to pull the film forward one frame, said advance mechanism being adapted to turn back idly against the direction of film travel in preparation for a new film advance cycle while the drive moves the elongated member in position for a new pulling operation in connection with the advance of a film frame.

MERLE D. TYLER.
ROBERT H. LARSON.

REFERENCES CITED

The following references are of record in the file of this patent:

UNITED STATES PATENTS

| Number | Name | Date |
|---|---|---|
| Re. 21,695 | Spencer | Jan. 14, 1941 |
| 1,624,669 | Lehwess | Apr. 12, 1927 |
| 1,679,399 | Brewster | Aug. 7, 1928 |
| 1,959,038 | Ridgway | May 15, 1934 |
| 2,067,835 | Erwood | Jan. 12, 1937 |

FOREIGN PATENTS

| Number | Country | Date |
|---|---|---|
| 104,888 | Switzerland | June 2, 1924 |
| 588,978 | France | Feb. 12, 1925 |